US011628977B2

(12) United States Patent
Chakalian

(10) Patent No.: US 11,628,977 B2
(45) Date of Patent: Apr. 18, 2023

(54) REUSABLE PACKING FOR CONSUMER GOODS IN TRANSIT

(71) Applicant: Paul Michael Chakalian, Yucca Valley, CA (US)

(72) Inventor: Paul Michael Chakalian, Yucca Valley, CA (US)

(*) Notice: Subject to any disclaimer, the term of this patent is extended or adjusted under 35 U.S.C. 154(b) by 202 days.

(21) Appl. No.: 16/913,992

(22) Filed: Jun. 26, 2020

(65) Prior Publication Data

US 2021/0403202 A1    Dec. 30, 2021

(51) Int. Cl.
  *B65D 30/00*  (2006.01)
  *B65D 33/28*  (2006.01)
  *B65D 81/02*  (2006.01)

(52) U.S. Cl.
  CPC ............ *B65D 29/00* (2013.01); *B65D 33/28* (2013.01); *B65D 81/022* (2013.01)

(58) Field of Classification Search
  CPC ....... B65D 29/00; B65D 33/28; B65D 81/022
  USPC ........................................................ 206/521
  See application file for complete search history.

(56) References Cited

U.S. PATENT DOCUMENTS

| | | | | |
|---|---|---|---|---|
| 1,861,864 A | * | 6/1932 | Kennedy ............... | B65D 33/28 493/225 |
| 5,830,119 A | * | 11/1998 | Chen ..................... | B65D 33/28 493/227 |
| 2004/0094448 A1 | * | 5/2004 | Koike ................... | B65D 81/133 206/521 |
| 2011/0059518 A1 | * | 3/2011 | Bribach ................ | A01G 9/025 435/266 |
| 2019/0128585 A1 | * | 5/2019 | Na ......................... | F25D 3/08 |

FOREIGN PATENT DOCUMENTS

| | | | |
|---|---|---|---|
| FR | 3081451 A1 | * | 11/2019 |
| JP | 10245047 A | * | 9/1998 |
| KR | 200328458 Y1 | * | 1/2009 |

OTHER PUBLICATIONS

Machine translation of FR-3081451-A1.*

* cited by examiner

*Primary Examiner* — Jes F Pascua
(74) *Attorney, Agent, or Firm* — Omni Legal Group; Omid E. Khalifeh; Ariana K. Santoro

(57) ABSTRACT

A package for protecting consumer goods from damage in transit is provided. Such package is defined by a sheet material, such as recycled polyethylene terephthalate felt and other recycled plastics. Edges of the sheet of material are bonded to form a package defining an open top end configured to receive fragile consumer goods therethrough. Means for cinching the open top end around or about the goods, either partially or completely are provided. The sheet of material may define some thickness that provides padding or cushioning between any item stored with the package and any items outside of it. It is contemplated that the packaging may be reused indefinitely to protect items such as glass bottles and others from damage which might otherwise occur between the point of sale and its intended destination.

9 Claims, 4 Drawing Sheets

REUSABLE PACKING FOR CONSUMER GOODS IN TRANSIT

GOVERNMENT CONTRACT

Not applicable.

CROSS-REFERENCE TO RELATED APPLICATIONS

Not applicable.

STATEMENT RE. FEDERALLY SPONSORED RESEARCH/DEVELOPMENT

Not applicable.

COPYRIGHT & TRADEMARK NOTICES

A portion of the disclosure of this patent document may contain material which is subject to copyright protection. This patent document may show and/or describe matter which is or may become trade dress of the owner. The copyright and trade dress owner has no objection to the facsimile reproduction by any one of the patent document or the patent disclosure, as it appears in the Patent and Trademark Office patent files or records, but otherwise reserves all copyrights and trade dress rights whatsoever.

TECHNICAL FIELD

The disclosed subject matter relates generally to reusable packaging for use by retail consumers and, more particularly, to cushioning bags configured to prevent individual items from breaking upon contact with other items while in transit from a point of sale.

BACKGROUND

The problem of transporting fragile items has long plagued retail customers. Many ask for their fragile items, such as glass jars, bottles, and trinkets, be wrapped in paper at the point of sale in order to prevent breakage between purchase and use. Some retailers even provide specially formed cardboard boxes configured with slots or dividers in an attempt to spatially separate fragile items, preventing them from contacting others and breaking as a result. These provide limited cushioning effect, though, and can be wasteful since packing paper has little use once crumpled and wrapped to protect items in transit. Of course, plastic cushioning material such as "bubble" wrap may also be provided. However, this is easily damaged and difficult to store, making it particularly disposable. As environmental sustainability becomes more of a concern, consumers are seeking reusable solutions to packaging and avoidance of waste.

Some proposals have been made to protect fragile items. One example of a protective consumer bag is U.S. Pat. No. 10,098,427 to Mogil et al. A soft-sided insulated container with an inflatable wall structure is provided. The disclosed container is formed in a box shaped and may tote a number of fragile items within. However, it does not disclose additional means for protecting each item within the container from damage caused by contact with any of the other contained items.

Standing-type air-filled packaging apparatuses have also been suggested as in U.S. Pat. Pub. No. 2018/0093809 filed by Zhang. Here, an inflatable main body provides cushioning for an item, such as a wine bottle, held within. Air cushioning is deficient, however, because it prevents the packaging from being readily collapsible and efficiently stored when filled. Indeed, desirably collapsible packages of this sort must be manually inflated prior to use, often by mouth, which is of course, unhygienic and tiring.

As another example, U.S. Pat. Pub. No. 2006/0233467 filed by Mize teaches pre-padded, filmed bags for fresh meat and poultry. These however, are not reusable or easily stored and are therefore deficient as well.

Thus, there is a continued need to provide a protective package for consumer goods.

SUMMARY

The present disclosure is directed to a package for protecting consumer goods in transit from a point of sale. Specifically, the package is configured to contain certain fragile grocery items, such as glass jars, bottles, and trinkets during transport from retail markets to their ultimate destination.

For purposes of summarizing, certain aspects, advantages, and novel features have been described. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested.

In accordance with one embodiment, the package defines a strapless sleeve made from a sheet of material and defining a single, cinchable opening configured to maintain any items within.

More particularly, the material may comprise a parallel top and bottom edge separated from one another by parallel first and second edges. The material may be any woven, nonwoven, or even knit material. In some embodiments, the material may be a nonwoven material such as felt having some thickness sufficient to cushion any contents. In some embodiments, the felt may comprises recycled polyethylene terephthalate ("rPET"). RPET may be particularly desirable for its durability as well as sustainable aspects of having been recycled. Other materials, such as wool and other polyester fibers known to those skilled in the art for making felt are of course contemplated and sufficient to practice the invention. Still other material suitable to practice the invention may be sheets of scuba knits and neoprene. Of course, these are offered by way of example only and not limitation.

While the material comprising the package should define some thickness to provide a cushioning barrier for contained items, it is contemplated that the material is not so thick as to either prevent it from draping around the body of any item or items contained within or hinder folding and storing the package in a compact manner when not in use. In some embodiments, the material may be at least 1 millimeter thick. In some embodiments, the material may be up to about 5 millimeters thick.

To form the package, a first half of the bottom edge may be bonded to a second half of the bottom edge, and the first edge may be bonded to the second edge. In one embodiment, each edge may be bonded in the disclosed configuration by stitching. In some embodiments, the edges may be bonded in the disclosed configuration by glue or another adhesive suitable to permanently bond the edges in the disclosed configuration.

In an alternative embodiment, an additional piece or sheet of material may be provided which comprises a main body and one or more edges which may be bonded to the bottom edge of the material. In such cases, it is contemplated that the package may be gusseted or otherwise involve the use of additional sheets of material to define a planar base when bonded to the sheet of material.

In addition, means for cinching the top edge to contain an item within the package may be provided. In some embodiments, the top edge may be folded over itself and bonded, such as by stitching or gluing, to a main body portion of the sheet of material in order to define a channel for receiving means for adjustably cinching the top edge. In some embodiments, the height of the channel defined by the folded top edge bonded in this manner may be about 0.25 to about 1.0 inches.

In some embodiments, the means for adjustably cinching the top edge may be an elongated cord. It is contemplated that a cord alone, when tied, may be sufficient to cinch the top edge of the package around an item contained therein. However, in some embodiments, it may be desirable to include one or more additional cord locks or toggles, known to those skilled in the art, to further secure the cord and top edge of the package in a desired position.

In accordance with the foregoing, an object of the invention is to protect fragile items while in transit from point of sale at a consumer retailer.

Another object of the invention is to protect items outside of the package from any particularly damaging aspects of the item contained within. For instance, some items may have sharp, protruding, textured, or even hard portions, whether decorative or functional, that can cause damage to items which come in to contact with them. In such cases, it may be desirable to store the possibly damaging item within the reusable packaging to prevent damage to items outside of such packaging.

Another object of the invention is to divert plastic waste by using recycled material for a new purpose.

Still another object of the invention is to prevent waste by avoiding loss caused by inadvertently breaking items before use.

Yet another object of the invention is to prevent waste associated with packaging by providing a device that may be reused indefinitely to protect items such as glass bottles, jars, trays, delicate fruits, and others from damage which might otherwise occur between the point of sale and final destination.

It is yet another object of the invention to provide a relatively low profile yet rugged solution to the problem of transporting fragile goods for the retail consumer.

It is even still another object of the invention to provide a washable, protective package.

One or more of the above-disclosed embodiments, in addition to certain alternatives, are provided in further detail below with reference to the attached figures. The disclosed subject matter is not, however, limited to any particular embodiment disclosed.

Figure 1:
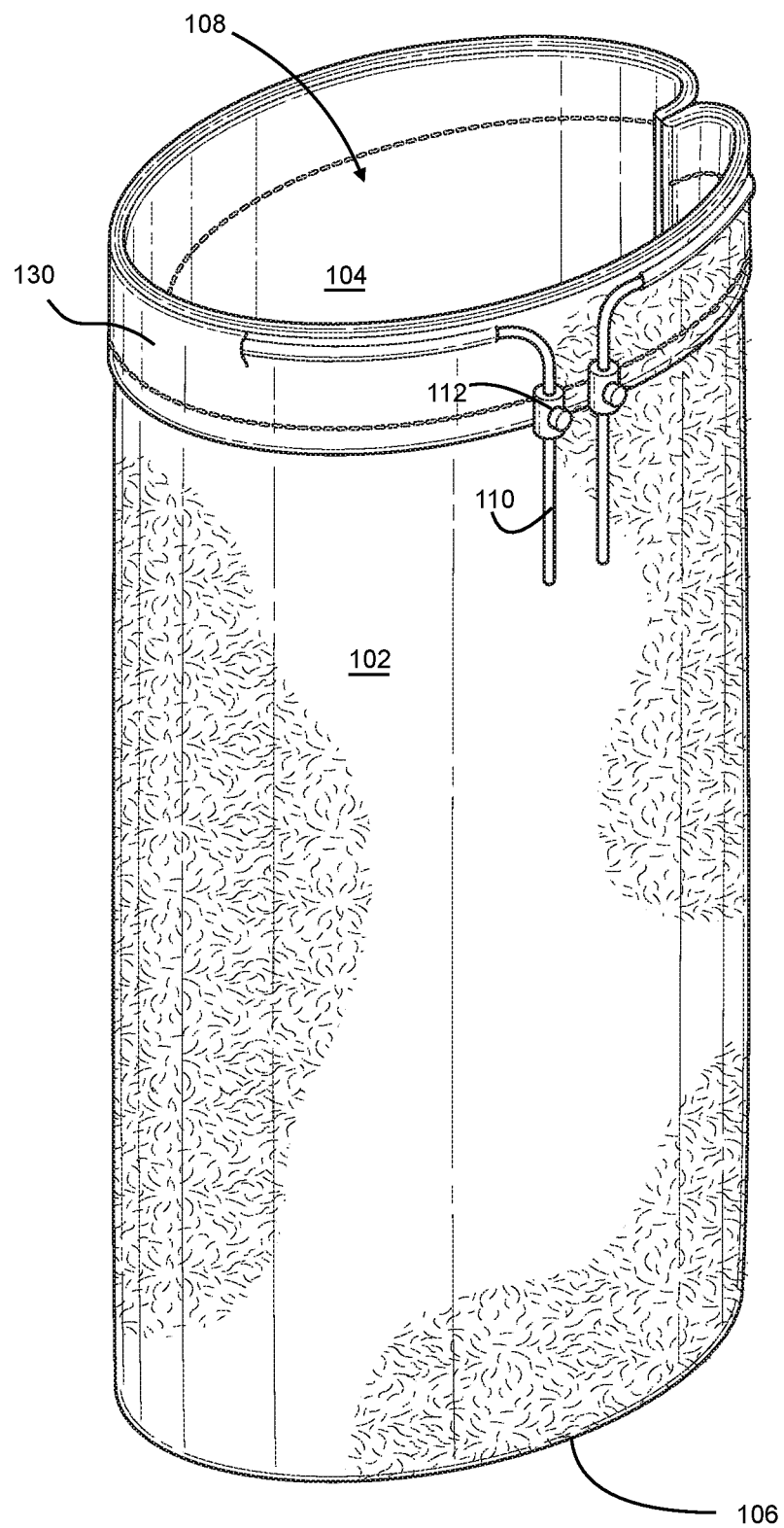
FIG. 1 shows a perspective view of reusable packaging in accordance with one embodiment of the invention.

The disclosed embodiments may be better understood by referring to the figures in the attached drawings, as provided below. The attached figures are provided as non-limiting examples for providing an enabling description of the method and system claimed. Attention is called to the fact, however, that the appended drawings illustrate only typical embodiments of this invention and are therefore not to be considered as limiting of its scope. One skilled in the art will understand that the invention may be practiced without some of the details included in order to provide a thorough enabling description of such embodiments. Well-known structures and functions have not been shown or described in detail to avoid unnecessarily obscuring the description of the embodiments.

DETAILED DESCRIPTION

Having summarized various aspects of the present disclosure, reference will now be made in detail to that which is illustrated in the drawings. While the disclosure will be described in connection with these drawings, there is no intent to limit it to the embodiment or embodiments disclosed herein. Rather, the intent is to cover all alternatives, modifications and equivalents included within the spirit and scope of the disclosure as defined by the appended claims.

Figure 2:
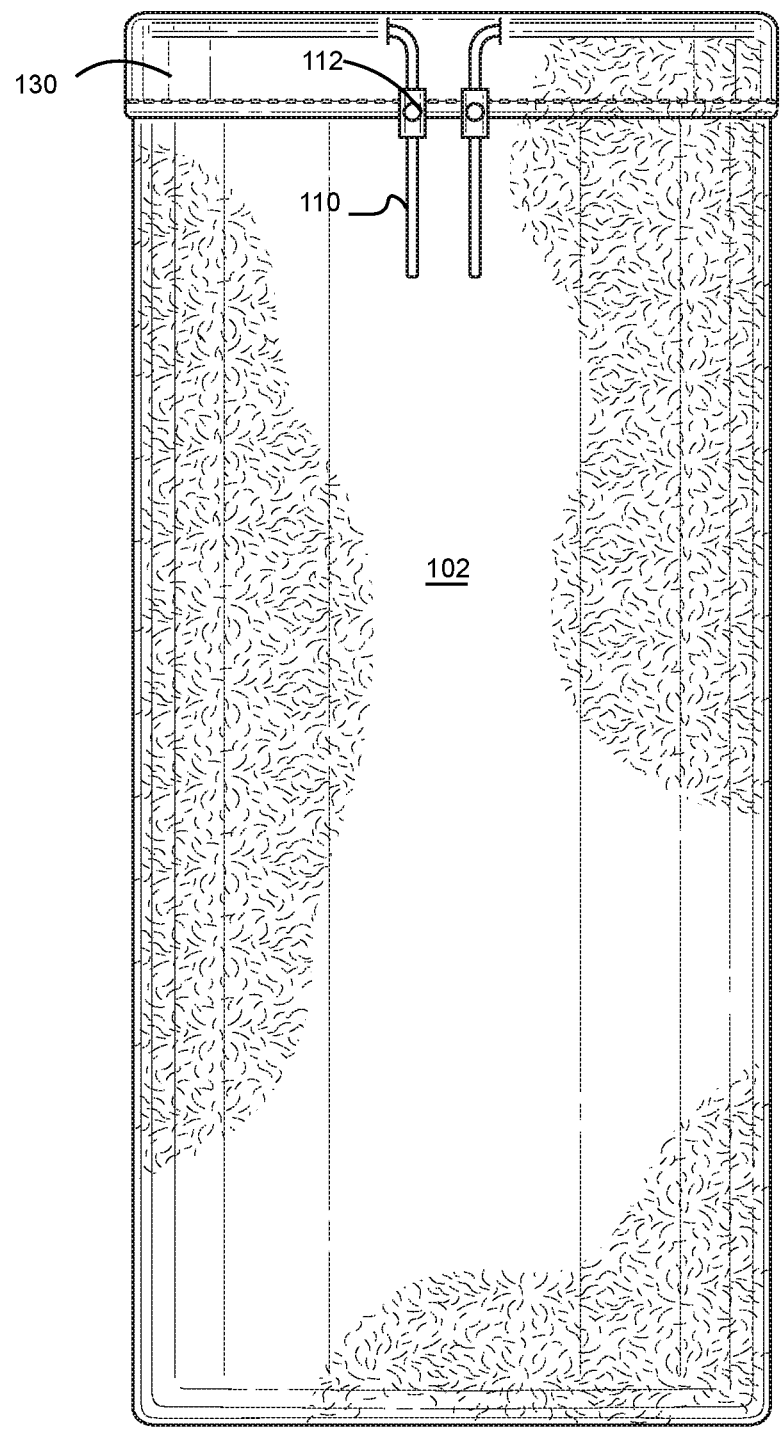
FIG. 2 shows a front plan view of reusable packaging in accordance with one embodiment of the invention.
Figure 3:
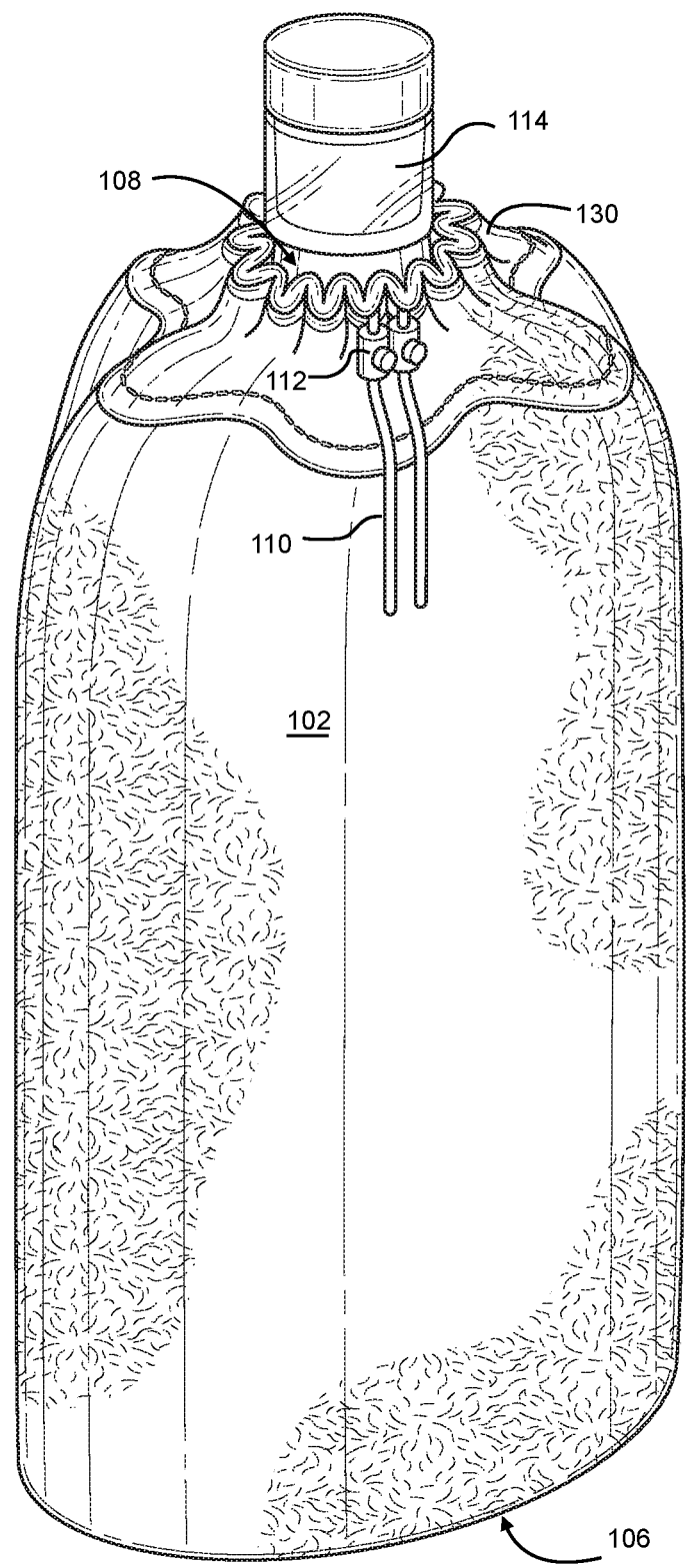
FIG. 3 shows another perspective view of reusable packaging in accordance with one embodiment of the invention.

With reference to FIGS. 1-3, a sheet of material is formed to define an outside 102, an inside 104, a closed bottom 106, and an open top 108 configured to receive an item therethrough. In an embodiment, means for cinching the open top may be provided as a cord 110 capable of being drawn and tied or, as pictured, set into a desired position by way of one or more toggles 112 or cord locks. It is noted, however, that in some embodiments a zipper, buttons, hook and loop fasteners, or even snaps may be provided in lieu of a cord to maintain any items within the package.

Turning to FIG. 3, an exemplary consumer good which may need protection from breakage is provided as a wine bottle 114. As such, it is contemplated that the package may be sized to accommodate a wine bottle, olive oil bottle, liquor bottle, or the like itself sized to hold about 500 ml to about 750 ml, as may be desired by a consumer. It may be seen that a neck portion of the wine bottle 114 extends from the opening 108 of the package. This may ensure that the packaged item is easy for the consumer to grip or even identify while packaged.

It is contemplated that the package may be configured to envelope the entirety of the enclosed item, however, permitting a portion of the item to extend from the package is not considered to hinder overall cushioning and protective effect of the package. Indeed, it is also contemplated that the package may be provided in various sizes in order to allow the consumer flexibility with the packaging of his purchases. It should be clear that the package may be sized to accommodate any variety of fragile items. For instance, olive oil, wine bottles, liquor bottles, various jarred goods, and home goods such as glassware, dishes, and even trinkets frequently benefit from padding during transportation. The package may be used to prevent damage to fragile containers or objects but may also protect other items from damage by enclosing items featuring sharp edges, spikes, protrusions, damaging textures, and the like.

In some instances, the package may be sized to snuggly accommodate a selection of commonly purchased fragile items since it is contemplated that a snug wrap may effectively absorb the shock of impact, reducing such item's susceptibility to damage.

Figure 4:
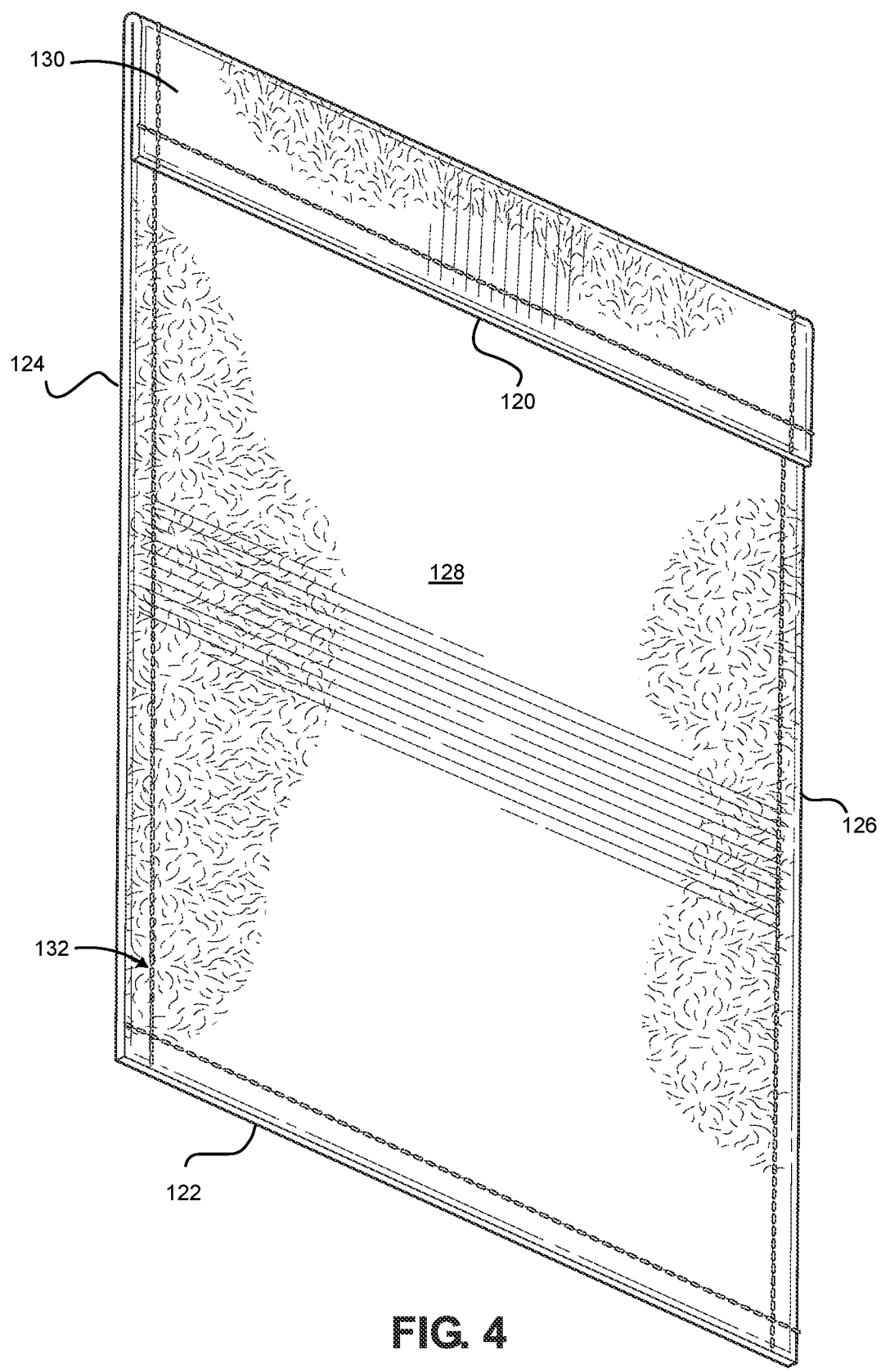
FIG. 4 shows an exploded perspective view of reusable packaging in accordance with one embodiment of the invention.

Construction of the package may be further clarified with reference to FIG. 4. In an embodiment, the package comprises a nonwoven material such as felt. The felt may be rugged, flexible, and reusable. In an embodiment, the felt comprises recycled plastic material, such as recycled polyethylene terephthalate ("rPET"). It is contemplated that this may be considered a sustainable option as its use diverts plastic waste which might otherwise sit in landfills indefinitely. Additionally, it may be washed, folded, stored, and reused by the consumer indiscriminately. The material may be about 1 mm to about 5 mm thick. In some embodiments, the material may be about 2 mm thick up to about 4 mm thick. In some embodiments, the material may be about 1 mm, about 2 mm, or about 3 mm thick. It is contemplated that the material may be thick enough to absorb some of the shock of impact between the enclosed item and additional items, but also thin enough to maintain flexibility.

In an embodiment, the material may comprise a parallel top and bottom edge 120, 122 separated from one another by parallel first and second edges 124, 126. To form the package, a first half of the bottom edge 122 may be bonded to a second half of the bottom edge 122, drawing the parallel first and second edges 124, 126 together to be bonded to one another. In another embodiment, two identically sized pieces of material may be provided. In such cases, a bottom edge from a first piece of material may be bonded to a bottom edge of a second piece, a first edge from the first piece of material may be bonded to a first edge of the second piece, and a second edge of the first piece of material may be bonded to a second edge of the second piece to define a pocket open along corresponding top edges.

In FIG. 4, stitching lines 132 are shown to demonstrate where each edge of the package may be bonded. Indeed, each of these edges may be bonded by way of stitching with a needle and thread. However, it is contemplated that the edges may be as effectively bonded to one another with certain adhesives capable of bonding fibers to one another. Edges of the package may be bonded to one another in any order desired. When configured for use, seams or bonded edges may be arranged on either an inside of the package or outside without any effect on the utility of the device.

Of course, it should be noted that in some embodiments, an additional piece or sheet of material (not pictured) may be provided which itself comprises a main body and one or more edges. Such one or more edges may be bonded to the bottom edge 122 of the material. In some embodiments, the additional piece or sheet of material may be smaller than the material earlier described. In such cases, it is contemplated that the package may be gusseted or otherwise involve the use of additional sheets of material to define a planar base when bonded to the sheet of material.

In addition to bonding the edges as described, it should be noted that the top edge 120 may be folded over itself and bonded to a main body portion 128 of the material to define a channel 130 for receiving means for adjustably cinching the top edge. An exemplary embodiment of the channel 130 is also visible in FIGS. 1-3, for reference.

In some embodiments, the material may be about 4 inches to about 16 inches long between the top and bottom edges 120, 122. In some embodiments, the material may be about 6 inches to about 30 inches wide between the first and second edges 124, 126. Of course, these measurements are provided by way of example only and not limitation.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

CONCLUSIONS, RAMIFICATIONS, AND SCOPE

While certain embodiments of the invention have been illustrated and described, various modifications are contemplated and can be made without departing from the spirit and scope of the invention. For example, the types of items which may be protected by the package may vary depending on the particular needs and interests of the end user. Accordingly, it is intended that the invention not be limited, except as by the appended claim(s).

The teachings disclosed herein may be applied to other systems, and may not necessarily be limited to any described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions and concepts of the various references described above to provide yet further embodiments of the invention.

Particular terminology used when describing certain features or aspects of the invention should not be taken to imply that the terminology is being refined herein to be restricted to any specific characteristics, features, or aspects of the reusable packaging for protecting consumer goods in transit with which that terminology is associated. In general, the terms used in the following claims should not be constructed to limit the reusable packaging for protecting consumer goods in transit to the specific embodiments disclosed in the specification unless the above description section explicitly define such terms. Accordingly, the actual scope encompasses not only the disclosed embodiments, but also all equivalent ways of practicing or implementing the disclosed system, method and apparatus. The above description of embodiments of the reusable packaging for protecting consumer goods in transit is not intended to be exhaustive or limited to the precise form disclosed above or to a particular field of usage.

While specific embodiments of, and examples for, the method, system, and apparatus are described above for illustrative purposes, various equivalent modifications are possible for which those skilled in the relevant art will recognize.

While certain aspects of the method and system disclosed are presented below in particular claim forms, various aspects of the method, system, and apparatus are contemplated in any number of claim forms. Thus, the inventor reserves the right to add additional claims after filing the application to pursue such additional claim forms for other aspects of the reusable packaging for protecting consumer goods in transit.

What is claimed is:

1. A reusable package for protecting consumer goods from damage in transit, comprising:
   a sheet of material, comprising recycled polyethylene terephthalate ("rPET") configured as a nonwoven felt, operative to cushion the consumer goods during transit, having a parallel top and bottom edge separated from one another by parallel first and second edges
   a first half of the bottom edge bonded to a second half of the bottom edge;
   the top edge folded over itself and bonded to a main body portion of the sheet of material to define a channel for receiving means for adjustably cinching the top edge, wherein the package is sized to accommodate a bottle from about 500 ml to about 750 ml.

2. The package of claim 1, wherein the first and second half of the bottom edge, the first and second edge, and the top edge and main body are respectively bonded to one another by stitching.

3. The package of claim 1, wherein the means for adjustably cinching the top edge is an elongated cord.

4. The package of claim 1, wherein the sheet of material is about 1 mm to about 5 mm thick.

5. The package of claim 1, wherein the sheet of material is about 2 mm thick.

6. The package of claim 1, wherein the sheet of material is about 4 inches to about 16 inches long between the top and bottom edges.

7. The package of claim 1, wherein the sheet of material is about 6 inches to about 30 inches wide between the first and second edges.

8. The package of claim 1, wherein the height of the channel defined by the folded top edge is about 0.25 to about 1.0 inches.

9. The package of claim 1, wherein the sheet is sized to permit the bottle to at least partially extend from the top edge of the package and the means for adjustably cinching the top edge is operative to secure around a portion of the bottle extending from the top edge of the package.

* * * * *